United States Patent

[11] 3,612,999

[72] Inventor Ramon Bergero
Rosario, Argentina
[21] Appl. No. 32,981
[22] Filed Apr. 29, 1970
[45] Patented Oct. 12, 1971
[73] Assignee Alva M. Henderson
Los Angeles, Calif.
a part interest

[54] VOLTAGE-MEASURING DEVICE HAVING INSULATED SEPARABLE PROBE CASING
4 Claims, 4 Drawing Figs.
[52] U.S. Cl. .................................................. 324/149, 324/72.5, 324/125
[51] Int. Cl. .................................................. G01r 1/06, G01r 1/14
[50] Field of Search .......................................... 324/149, 72.5, 125

[56] References Cited
UNITED STATES PATENTS
3,287,642  11/1966  Simkins ...................... 324/149

OTHER REFERENCES
Electrical Review; 2-5-26; p. 231. 324/72.5

Primary Examiner—Alfred E. Smith
Attorney—Spensley and Horn

ABSTRACT: A hand-held apparatus for measuring high applied voltages in electrical circuits, having an elongate nonconductive casing longitudinally separable into two casing sections. A voltmeter is mounted to an enlarged intermediate portion of the casing, one tubular end portion providing a handle, an opposing tubular end portion being externally threaded for mounting of an insulating sheath enclosing an elongate resistor having one end extending into the casing and connected to one terminal of the voltmeter and the other end connected to a test probe which projects from the insulating sheath. A ground wire is connected to the other meter terminal and projects from the handle end and terminated in a ground clip. A switch mounted in the handle portion enables short circuiting of the meter to damp the meter movement when not in use to protect it from physical shock. The two casing sections are held in assemblage by a transversely extending screw in the handle end portion an the insulating sheath threaded onto the other casing end portion.

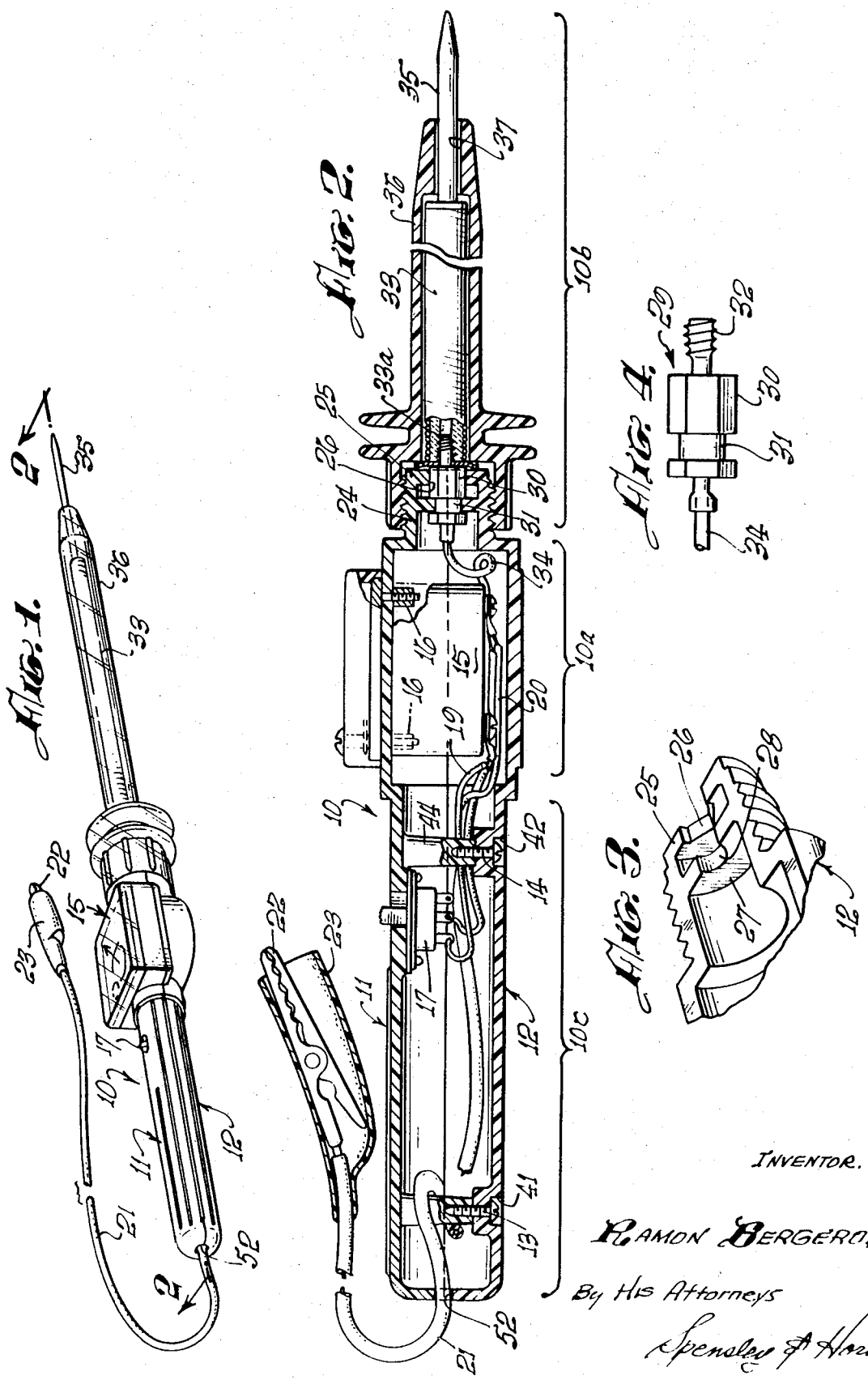

3,612,999

VOLTAGE-MEASURING DEVICE HAVING INSULATED SEPARABLE PROBE CASING

CROSS-REFERENCE TO RELATED APPLICATIONS

This application is an improvement on my copending application Ser. No. 594,505 filed Nov. 15, 1966 now U.S. Pat. No. 3,522,533.

BACKGROUND OF THE INVENTION

1. Field of the Invention

This invention relates to voltmeters and more particularly to those voltmeters used for the measurement of high potentials such as the accelerating voltage of color television picture tubes.

2. Description of the Prior Art

The measurement of picture tube accelerating voltage during a house service call has heretofore been an inconvenient and sometimes dangerous task. Meters capable of making these measurements are usually bulky, costly, and require the user to bring his hand into close proximity to the high-voltage terminal.

The present invention is small enough to be carried in a repairman's toolbox, is susceptible of economical manufacture, and is safe and simple to use.

SUMMARY OF THE INVENTION

The invention comprises an insulated housing or casing having a handle and containing a meter, a meter-shorting switch, a series multiplier resistance and a test probe which projects from the casing opposite the handle. A ground lead wire with an alligator clip attached extends from the end of the handle. Meter damage due to transportation shocks is prevented by a switch mounted in the handle for shorting the meter terminals when the instrument is not in use.

The casing is formed of two mateable, longitudinally extending casing sections, the sections when assembled forming a casing defining an enlarged hollow intermediate section separating a first externally threaded tubular end section and a second tubular handle end section. The meter is mounted in the intermediate section and the switch in the handle end section. The casing sections are secured in assemblage at the handle end by releasable means such as a transversely extending screw, and at the other end by an insulating sheath threaded onto the casing sections and extending to the test probe, the multiplier resistor being encased in the insulating sheath.

BRIEF DESCRIPTION OF THE DRAWINGS

FIG. 1 is a perspective view of a device in accordance with the present invention.

FIG. 2 is a cross section, in elevation, of a device in accordance with the present invention taken along the line 2—2 of FIG. 1.

FIG. 3 is a perspective view of the threaded end portion of the device, partly cut away.

FIG. 4 is an elevation view of a stud for the mounting of a resistor to the threaded end portion of FIG. 3.

DESCRIPTION OF THE PREFERRED EMBODIMENT

Turning now to the drawings, in FIG. 2 there is shown a presently preferred embodiment of a device in accordance with the present invention concepts. An elongate casing, generally indicated by the reference numeral 10, is longitudinally separable into two casing sections 11 and 12, the casing sections being made of electrically nonconductive material. The casing 10 defines an enlarged, hollow intermediate portion 10a separating opposed end portions 10b and 10c.

A voltmeter 15 is secured to the casing section 11 within the casing intermediate portion 10a by means of nuts 16. The casing end portion 10c is substantially cylindrical and forms a handle by which the tester is grasped. A switch 17 is secured to casing section 11 within the handle end portion 10c, the switch being connected across the terminals of voltmeter 15 and serving to short the meter when the instrument is not in use. Wires 19 and 20 connect switch 17 to voltmeter 15. Ground lead 21 also connects to one of the terminals of voltmeter 15.

Ground lead 21 extends out of casing 10 through a hole 52 at the end of handle end portion 10c. Ground lead 21 may be of any convenient length, a length of 3 to 4 feet being preferred for most applications. Ground lead 21 terminates in an electrical connector such as alligator clip 22 covered by a rubber or soft plastic sheath 23.

The end portion of section 10a opposite section 10c of casing 10 is provided with external threads 24. As can best be seen in FIG. 3, at the tip of end portion 10a is a wall 25 defining an hexagonal opening 26. Spaced from wall 25 is another wall 27 defining a substantially round opening 28.

Terminal stud 29 (FIG. 4), having an hexagonal portion 30 and a reduced diameter round portion 31 for mating with openings 26 and 28, respectively, has a threaded end portion 32 which protrudes from housing 10a when mated therein and holds a multiplier resistor 33 in threaded engagement. Terminal stud 29 is also connected to voltmeter 15 by wire 34. Resistor 33 is not only mechanically held by terminal 29 but is electrically connected to it via a threaded end 33a.

The end of resistor 33 opposite terminal 29 terminates in a test probe 35 which protrudes from the end of resistor 33. The resistance value of resistor 33 depends on the desired voltage range of the tester and the sensitivity of the voltmeter, and can be calculated by use of Ohm's Law as is well known in the art. A typical tester having a full scale range of 30 kv. and using a voltmeter having a sensitivity of 20,000 ohms per volt (0–50 microamperes) would require a resistor having a resistance of 600 megohms.

A tubular nonconductive sheath 36 is internally threaded at one end for engagement with the threads 24 of the casing section 10a to provide additional mechanical support for resistor 33 as well as insulating it. Test probe 35 is embedded in the distal end of sheath 36 to protrude from hole 37 defined through the distal end of sheath 36. Threaded engagement of the sheath 36 with the casing end portion 10b serves to hold those ends of casing sections 11 and 12 in assemblage, the other (handle) ends of the casing sections being held in assemblage by a pair of transversely extending screws 13 and 14 passing through suitable holes 41 and 42, respectively, defined in casing section 12 and being threaded into internal bosses 43 and 44 in casing section 11, which bosses may also serve as winding posts around which the ground lead 21 may be secured.

In use, alligator clip 22 is connected to the chassis of the set being tested, or other suitable ground point, and test probe 35 is held against the high-voltage terminal of a picture tube, or other test point. Opening switch 17 allows the voltage to be read on meter 15. When not in use, switch 17 is kept in the closed position damping meter 15 so that the movement will not be damaged by the normal handling shocks incidental to transport.

I claim:

1. A unitary electrical circuit testing instrument comprising:
   a. an elongate, nonconductive casing longitudinally separable into first and second casing sections, said casing defining an enlarged intermediate hollow portion separating first and second opposing tubular end portions, said first tubular end portion being externally threaded;
   b. a voltmeter mounted in the intermediate portion of said first casing section and having a pair of terminals for connection of an external electrical circuit to the meter movement;
   c. a switch mounted in the second end portion of said first casing section;
   d. electrical leads within said casing connecting said switch across the pair of meter terminals for short circuiting the terminals when the meter is not in use to thereby damp the meter movement and protect it from physical shock;

e. a flexible ground lead having one end connected to one of said meter terminals within said casing and having its other end projecting from the second tubular end portion of said casing;
f. an elongate resistor mounted at one of its ends to the first tubular end portion of said casing and projecting therefrom, the mounted end of said resistor being electrically connected to the other of said meter terminals within said casing;
g. a test probe mounted to the free end of said resistor, projecting therefrom and electrically connected thereto;
h. an elongate tubular sheath of electrical insulating material internally threaded at one end for receptive engagement of the externally threaded first end portion of said casing, said insulating sheath being threaded onto the first end portion of said casing and enclosing said resistor, said test probe projecting from the other sheath end; and,
i. releasable means for rigidly interconnecting the second end portions of said casing section, said means acting in conjunction with the insulating sheath threaded onto the first end portions of the casing sections to rigidly secure the casing sections to each other in an assemblage forming said casing.

2. Device as specified in claim 1, wherein said elongate resistor is mounted to said first tubular end portion of said casing by means of a stud projecting coaxially from the end of said resistor.

3. Device as specified in claim 2, wherein said first casing tubular end portion defines a hexagonal opening in its end wall and a spaced-apart transverse inner wall defining a circular opening extending coaxially therethrough.

4. Device as specified in claim 3, wherein said stud defines axially spaced-apart portions of hexagonal cross section sized to fit the hexagonal opening in said first casing tubular end portion, and an intermediate portion of circular cross section of reduced diameter sized to fit the circular opening in the transverse inner wall of said first tubular end portion.